United States Patent
Sundar et al.

(10) Patent No.: US 11,317,288 B2
(45) Date of Patent: Apr. 26, 2022

(54) SYSTEMS AND METHODS FOR SECURING COMMUNICATION BETWEEN A NATIVE APPLICATION AND AN EMBEDDED HYBRID COMPONENT ON AN ELECTRONIC DEVICE

(71) Applicant: JPMORGAN CHASE BANK, N.A., New York, NY (US)

(72) Inventors: Gayathri Sundar, Irving, TX (US); Johannes Albertus Van Zijl, Ashley, OH (US); Ramesh Rangaswamy, Lewis Center, OH (US); Jeffrey D. Langus, Mamaroneck, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 22 days.

(21) Appl. No.: 16/658,678

(22) Filed: Oct. 21, 2019

(65) Prior Publication Data
US 2021/0120417 A1 Apr. 22, 2021

(51) Int. Cl.
| | |
|---|---|
| *H04W 12/084* | (2021.01) |
| *H04L 29/06* | (2006.01) |
| *H04W 12/06* | (2021.01) |
| *H04W 12/71* | (2021.01) |

(52) U.S. Cl.
CPC ....... *H04W 12/084* (2021.01); *H04L 63/0428* (2013.01); *H04L 63/0876* (2013.01); *H04L 63/105* (2013.01); *H04L 63/126* (2013.01); *H04W 12/06* (2013.01); *H04W 12/71* (2021.01)

(58) Field of Classification Search
CPC ... H04W 12/084; H04W 12/71; H04W 12/06; H04L 63/0428; H04L 63/0876; H04L 63/105; H04L 63/126
See application file for complete search history.

(56) References Cited

U.S. PATENT DOCUMENTS

| | | | | |
|---|---|---|---|---|
| 10,009,321 | B2 * | 6/2018 | Ng | H04W 12/041 |
| 2014/0310182 | A1 * | 10/2014 | Cummins | G06Q 20/3274 705/71 |
| 2015/0178724 | A1 * | 6/2015 | Ngo | G06Q 20/385 705/71 |
| 2018/0189476 | A1 * | 7/2018 | Li | G06F 21/32 |

* cited by examiner

*Primary Examiner* — Ashokkumar B Patel
*Assistant Examiner* — William B Jones
(74) *Attorney, Agent, or Firm* — Greenberg Traurig LLP

(57) ABSTRACT

A method for securing communication may include: (1) receiving, at the authorization platform and from a hybrid browser component of a computer application, an encrypted payload comprising an authentication code, a bundle identifier, and an application unique identifier; (2) registering, by the authorization platform, a username for a user; (3) receiving, at the authentication framework and from the computer application, the username and the encrypted payload; (4) receiving, at the authentication framework, user login credentials from the user; (5) validating, by the authentication framework, the user login credentials; (6) passing, by the authentication framework to the authorization platform, the encrypted payload; (6) comparing, by the authorization platform the encrypted payload received from the computer application to the encrypted payload received from the authentication framework; and (8) accepting, by the authentication framework, the encrypted payload and tying the process to the computer application.

12 Claims, 2 Drawing Sheets

SYSTEMS AND METHODS FOR SECURING COMMUNICATION BETWEEN A NATIVE APPLICATION AND AN EMBEDDED HYBRID COMPONENT ON AN ELECTRONIC DEVICE

BACKGROUND OF THE INVENTION

Field of the Invention

The present disclosure generally relates to systems and methods for securing communication between a native application and an embedded hybrid component on an electronic device.

Description of the Related Art

Computer programs or applications executed by mobile electronic devices may use embedded hybrid applications written in JavaScript to perform certain functions. This use enables the computer program to perform actions that it otherwise could not.

SUMMARY OF THE INVENTION

Systems and methods for securing communication between a native application and an embedded hybrid component on an electronic device are disclosed. In one embodiment, in an information processing apparatus comprising an authorization platform and an authentication framework, each comprising at least one computer processor, a method for securing communication between a native application and a hybrid browser component on an electronic device may include: (1) receiving, at the authorization platform and from a hybrid browser component of a computer application executed by an electronic device, an encrypted payload comprising an authentication code, a bundle identifier, and an application unique identifier; (2) registering, by the authorization platform, a username for a user; (3) receiving, at the authentication framework and from the computer application, the username and the encrypted payload; (4) receiving, at the authentication framework, user login credentials from the user; (5) validating, by the authentication framework, the user login credentials; (6) passing, by the authentication framework to the authorization platform, the encrypted payload; (6) comparing, by the authorization platform the encrypted payload received from the computer application to the encrypted payload received from the authentication framework; and (8) accepting, by the authentication framework, the encrypted payload and tying the process to the computer application.

In one embodiment, the authentication code may include a timestamp.

In one embodiment, the mobile computer application may execute digital account opening process.

In one embodiment, the authentication code has an expiration. The authorization platform may validate that the authentication code is unexpired.

In one embodiment, the encrypted payload further comprises a device identifier.

In one embodiment, the method may further include the authentication framework generating a session identifier and device identifier after validating the login credentials.

In one embodiment, the authentication framework may provide the session identifier to the authorization platform.

In one embodiment, the method may further include decisioning an application to open an account.

According to another embodiment, a system for securing communication between a native application and a hybrid browser component on an electronic device may include a mobile electronic device executing a computer application comprising a hybrid browser component; a security framework in communication with the hybrid browser component; an authorization platform in communication with the hybrid browser component; a risk engine in communication with the authorization platform; and an authentication framework in communication with the hybrid browser component. The hybrid browser component may receive an encrypted payload comprising an authentication code, a bundle identifier, and an application unique identifier from the security framework. The authorization platform may register a username for a user. The computer application may provide the authentication framework with the username and the encrypted payload, and may provide the authentication framework with user login credentials received from the user. The authentication framework may validate the user login credentials, and may provide the authorization platform with the encrypted payload. The authorization platform may compare the encrypted payload received from the computer application to the encrypted payload received from the authentication framework. The authentication framework may accept the encrypted payload and ties the process to the computer application.

In one embodiment, the authentication code may include a timestamp.

In one embodiment, the mobile computer application may execute a digital account opening process.

In one embodiment, the authentication code has an expiration. The authorization platform may validate that the authentication code is unexpired.

In one embodiment, the encrypted payload may also include a device identifier.

In one embodiment, the authentication framework may generate a session identifier and device identifier after validating the login credentials.

In one embodiment, the authentication framework may provide the session identifier to the authorization platform.

In one embodiment, the authentication platform may decision an application to open an account.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
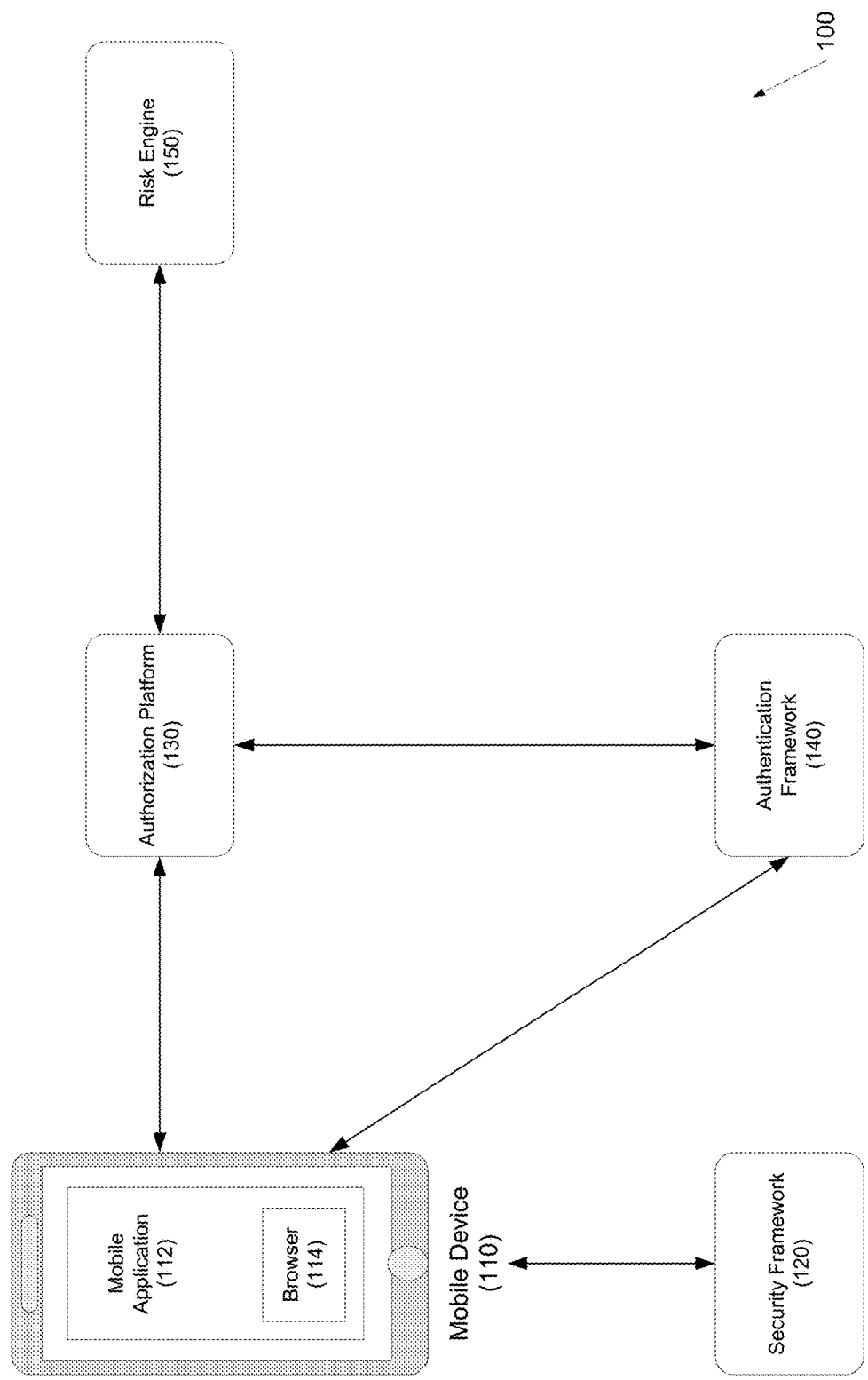
FIG. 1 depicts a system for securing communication between a native application and an embedded hybrid component on an electronic device according to one embodiment.

Embodiments are directed to systems and methods for securing communication between a native application and an embedded hybrid component on an electronic device.

In one embodiment, during digital account opening, or DAO, using a native application that uses a hybrid component (e.g., written in JavaScript running within a context of a hybrid browser, such as WebView), a one-time token may be securely transferred between the hybrid browser session within the native application and the application. The one-time token may establish a connection between the two independent instances within the mobile (e.g., native) application. It may further establish device trust during digital account opening.

Embodiments may facilitate the transfer of an opaque blob or payload that may be used to store session keys, secure data, etc., while maintaining confidentiality and integrity throughout the process, from a mobile application platform to an embedded hybrid web view back to a service endpoint. The blob or payload may include, for example, an application universally unique identifier (UUID), an application bundle identifier that may uniquely identify an application, and an authentication code.

A security framework may generate an authentication code (e.g., AUTH_CODE) that may be a short-lived code, such as 3-5 minutes. In one embodiment, authentication code may include a timestamp. The authentication code may be based, for example, on a random number.

In one embodiment, the security framework may provide an API to return an encrypted payload using, for example, RSA public key encryption.

In one embodiment, fields and or information that may be used to identify the device (e.g., AUTH_MOBILE_MIS) may be included in the blob or payload.

The mobile application, using the security framework, may launch a DAO flow. In one embodiment, the mobile application may call the security framework to retrieve the encrypted blob or payload, and may pass the encrypted blob or payload as part of java bridge to a DAO hybrid browser, which may be a component of the mobile application. The application may then pass the encrypted blob or payload to authentication after a successful DAO.

In one embodiment, the user may complete the DAO flow, and may enter a username and password. The username and password may be encrypted and provided to an authorization platform. The authorization platform may decrypt the blob or payload and may generate a session identifier (e.g., SM_SESSION) and device identifier (e.g., device_id) for the user. The DAO process may receive the session identifier from authorization platform, and may store the session identifier in store (e.g., a cookie store) of the native application.

The hybrid browser may pass the encrypted payload to the authentication platform, and the authentication platform may decrypt the payload and persist this data against the username. If necessary, the user may complete the DAO flow and may successfully register username and password to the authentication platform. The DAO hybrid browser may return the username to mobile application.

The authentication framework may launch a login flow after a successful DAO for a new customer. The customer may enter, for example, the customer's username and password. The framework may encrypt the application UUID, the bundle identifier, and the authentication code. For example, AES with a key generated using PBKFD2(username+password+fixedsalt+iteration_count). The encrypted payload may be sent as part of login to the authentication platform.

In another embodiment, the authentication framework may also check for a session identifier (e.g., SM_SESSION) with a store (e.g., a cookie store).

The authorization platform may receive the encrypted payload as part of login request; decrypt the payload by deriving the same AES key using, for example, username+password+fixedsalt, iteration_count; and may compare the decrypted payload to match what was received above.

In one embodiment, the session identifier may be provided to authentication framework. The authentication framework may provide authentication services.

If the decrypted payload matches the earlier payload, and the timestamp has not expired, authentication services may accept the payload and may tie the DAO application from device to first application login.

After successful login, authentication services may send this event to a back-end risk engine to evaluate risks and preset rules to update the trust level for the customer. For example, the risk engine may receive a trust flag, and may provide this to the authorization platform, which may provide this trust flag to the authentication framework.

Embodiments may provide some or all of the following advantages: (1) a man-in-the-middle on Java-bridge cannot understand the encrypted payload and the format used to read this token; (2) the user may be made to enter username and password to generate an encryption key on an authorization framework to re-encrypt the payload, so this verifies the user; (3) the authorization platform may reject the authentication code based on expiration and/or use count, which prevents replay attacks; (4) the payload may be encrypted when it leaves the mobile application; (5) the authorization platform receives the same blob or payload from the mobile application and the authentication framework, which proves that DAO was initiated from a native app context, and not by a rogue or tampered DAO middleware on the native app.

Referring to FIG. 1, a system for securing communication between a native application and an embedded hybrid component on an electronic device is disclosed according to one embodiment. System 100 may include mobile device 110 that may execute one or more computer applications, programs, etc. such as mobile application 112. Mobile device 110 may be any suitable mobile device, including smartphones, tablet computers, notebook computers, desktop computers, smart watches, Internet of Things (IoT) appliances, etc.

Mobile application 112 may include browser 114, which may be a hybrid browser, such as WebView.

Mobile device 110, mobile application 112, and/or browser 114 may interface with security framework 120, which may be provided by a financial institution providing a digital account opening process. In one embodiment, security framework 120 may be hosted by the financial institution; in another embodiment, security framework 120 may be hosted by a third party.

In one embodiment, security framework 120 may generate and/or provide a payload for mobile application 112 and/or browser 114. The payload may include, for example, an authentication code. In one embodiment, the authentication code may be a short-lived code, such as 3-5 minutes. In one embodiment, authentication code may include a timestamp. The authentication code may be based, for example, on a random number.

Mobile device 110, mobile application 112, and/or browser 114 may interface with authorization platform 130. In one embodiment, authorization platform may decision a request for digital account opening. In one embodiment, authorization platform may interface with systems that may be internal to or external to the financial institution, including, for example, risk engine 150.

Risk engine 150 may provide a risk assessment of the digital account opening request. In one embodiment, the risk assessment may be based on the mobile device from which the request originated, the IP address of the request, the username and password, past experience with the username, etc.

Mobile device 110, mobile application 112, and/or browser 114 may interface with authentication framework 140. Authentication framework 140 may authenticate the user based on the username and password received from mobile application 112 and/or browser 114.

Figure 2:
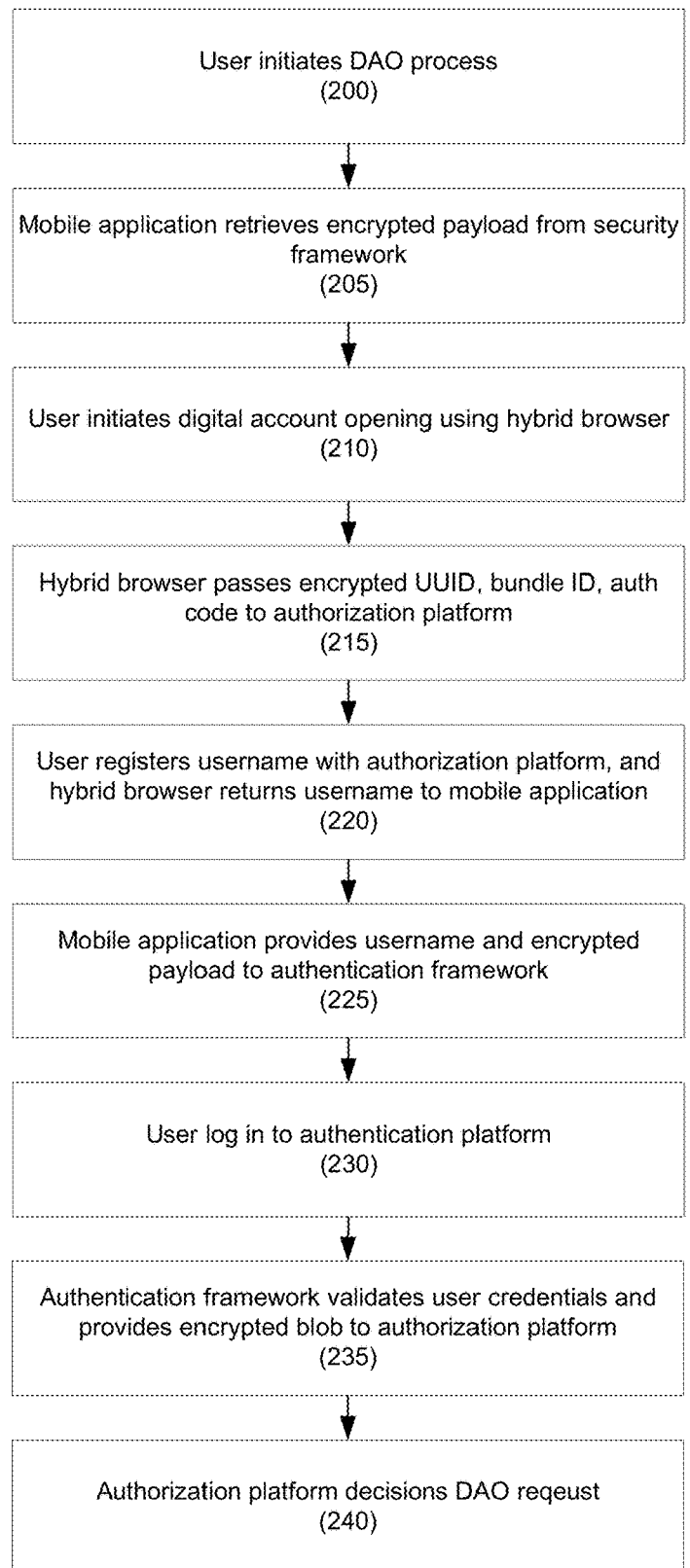
FIG. 2 depicts a method for securing communication between a native application and an embedded hybrid component on an electronic device according to one embodiment.

Referring to FIG. 2, a method for securing communication between a native application and an embedded hybrid component on an electronic device is disclosed according to one embodiment.

In step 200, a user may initiate the DAO process using a mobile application or computer program. In one embodiment, the mobile application may include a hybrid browser component.

In one embodiment, using the mobile application, the user may initiate the DAO process by selecting an option to open an account. Any other suitable manner of initiating the DAO process may be used as is necessary and/or desired.

In step 205, the mobile application may receive an encrypted payload (i.e., a blob) from a security framework. In one embodiment, the encrypted payload may include an authentication code. In one embodiment, the authentication code may be a short-lived code, such as 3-5 minutes. The authentication code may have a longer life, or a short life, as is necessary and/or desired. In one embodiment, authentication code may include a timestamp. The authentication code may be based, for example, on a random number, a pseudo-random number, etc.

In one embodiment, the mobile application may use an API to retrieve the encrypted payload.

In step 210, the mobile application may launch a digital account opening (DAO) process using, for example, a hybrid browser component, and, in step 215, the mobile application may pass the payload including, for example, the authentication code, a bundle identifier, and an application unique identifier (e.g., application UUID) from a hybrid browser in the mobile application to an authorization platform.

In one embodiment, the payload may be encrypted.

In one embodiment, fields and or information that may be used to identify the device (e.g., AUTH_MOBILE_MIS) may be included in the payload.

In step 220, the user may complete the DAO flow and may successfully register username with the authorization platform. The hybrid browser may return the username to mobile application using, for example, a Java bridge.

If necessary, in step 225, the user may enter a username and password into the mobile application, and the mobile application may provide the username and password to an authentication framework to authenticate the user. In one embodiment, the username and password may be encrypted before they are provided to the authentication framework.

In one embodiment, the user may be asked for authentication information if any criteria in the risk engine does not match. In one embodiment, challenge questions, out-of-band authentication, etc. may be used as is necessary and/or desired.

In step 230, the authentication framework may decrypt the username and password and may validate the username and password. In one embodiment, after validation, the authentication framework may pass the encrypted application unique identifier, the bundle identifier, and the authentication code to the authorization platform. The authentication framework may further generate a session identifier (e.g., SM_SESSION) and device identifier (e.g., device_id) for the user.

In one embodiment, the authentication framework may receive the information with the username and password.

In one embodiment, the session identifier may be provided to the authorization platform.

In step 235, the authorization platform may receive and decrypt the payload. If the decrypted payload matches the earlier payload, and the timestamp has not expired, authentication services may accept the payload and may tie the DAO application from the device to first application login.

In step 240, the authorization platform may decision the application. In one embodiment the authorization engine may provide information to a back-end risk engine to evaluate risks and preset rules to update the trust level.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for securing communication of a native application executing on a mobile electronic device, comprising:
    in an information processing apparatus comprising an authorization platform and an authentication framework, each comprising at least one computer processor:
        receiving, by the authorization platform and from the native application, a request to decision a digital account opening including a username, a password, and an encrypted payload, wherein the encrypted payload comprises an expiring authentication code and a timestamp;
        decrypting, by the authorization platform, the encrypted payload;
        generating, by the authorization platform, a session identifier that identifies a session between the native application and the authorization platform;
        returning, by the authorization platform, the session identifier to the native application;
        receiving, by the authentication framework and from the native application, the username, the password, the encrypted payload, and the session identifier;
        decrypting, by the authentication framework, the encrypted payload;
        validating, by the authentication platform, a user of the native application, based on the username and password;
        determining, by the authentication framework and based on the timestamp, that the expiring authentication code is unexpired;
        re-encrypting, by the authentication framework, the encrypted payload;
        sending, by the authentication framework, the encrypted payload and the session identifier to the authorization platform;
    comparing, by the authorization platform, the encrypted payload received from the native application and the session identifier sent to the native application to the encrypted payload received from the authentication framework and the session identifier received from the authentication framework;
    determining, by the authorization platform, that the encrypted payload received from the native application and the session identifier sent to the native application matches the encrypted payload received from the authentication framework and the session identifier received from the authentication framework, respectively; and
    decisioning the request to decision the digital account opening based on determining the match.

2. The method of claim 1, wherein the encrypted payload comprises a bundle identifier.

3. The method of claim 1, wherein the native application executes a digital account opening process.

4. The method of claim 1, wherein the encrypted payload comprises an application unique identifier.

5. The method of claim 1, wherein the authorization platform determines that the authentication code is unexpired.

6. The method of claim 1, wherein the encrypted payload further comprises a device identifier associated with the mobile electronic device.

7. A system for securing communication of a native application executing on a mobile electronic device, comprising:
    an authorization platform configured to communicate with the native application; and
    an authentication framework configured to communicate with the native application;
    wherein the authentication framework and the security framework are further configured to communicate with each other;
    wherein the authorization platform:
        receives, from the native application, a request to decision a digital account opening including a username, a password, and an encrypted payload, wherein the encrypted payload comprises an expiring authentication code and a timestamp, a bundle identifier, and an application unique identifier;
        decrypts the encrypted payload;
        generates a session identifier that identifies a session between the native application and the authorization platform; and
        returns the session identifier to the native application;
    wherein the authentication framework:

receives, from the native application, the username, the password, the encrypted payload, and the session identifier;
decrypts the encrypted payload;
validates a user of the native application, based on the username and password;
determines, based on the timestamp, that the expiring authentication code is unexpired;
re-encrypts the encrypted payload; and
sends the encrypted payload and the session identifier to the authorization platform; and
wherein the authorization platform:
compares the encrypted payload received from the native application and the session identifier sent to the native application to the encrypted payload received from the authentication framework and the session identifier received from the authentication framework;
determines that the encrypted payload received from the native application and the session identifier sent to the native application matches the encrypted payload received from the authentication framework and the session identifier received from the authentication framework, respectively; and
decisions the request to decision the digital account opening based on determining the match.

8. The system of claim 7, wherein the encrypted payload comprises a bundle identifier.

9. The system of claim 7, wherein the native application executes a digital account opening process.

10. The system of claim 7, wherein the encrypted payload comprises an application unique identifier.

11. The system of claim 7, wherein the authorization platform determines that the authentication code is unexpired.

12. The system of claim 7, wherein the encrypted payload further comprises a device identifier associated with the mobile electronic device.

\* \* \* \* \*